United States Patent [19]

Stone

[11] Patent Number: 4,643,025
[45] Date of Patent: Feb. 17, 1987

[54] SYSTEM FOR MEASURING LIQUID LEVEL IN A PRESSURIZED VESSEL

[76] Inventor: Gerald P. Stone, 425 Nelson Rd., Santa Cruz, Calif. 95066

[21] Appl. No.: 740,835

[22] Filed: Jun. 3, 1985

[51] Int. Cl.$^4$ ............................................. G01F 23/14
[52] U.S. Cl. ....................................... 73/302; 340/614
[58] Field of Search ................. 73/291, 299, 301, 302; 340/614

[56] References Cited

U.S. PATENT DOCUMENTS

| | | | |
|---|---|---|---|
| 2,337,171 | 12/1943 | Winton | 73/302 |
| 2,521,477 | 9/1950 | Pellettere | 73/299 |
| 2,791,906 | 5/1957 | Vetter | 73/291 |
| 3,132,516 | 5/1964 | Kinderman | 73/299 |
| 3,232,111 | 2/1966 | Kinderman | 73/301 |
| 3,250,123 | 5/1966 | Clayton | 73/301 |
| 3,371,534 | 3/1968 | Akeley | 73/299 |
| 3,394,590 | 7/1968 | Napolitano | 73/299 |
| 3,481,203 | 12/1969 | Ackerman et al. | 73/438 |
| 4,084,435 | 4/1978 | Weik et al. | 73/299 |
| 4,394,346 | 7/1983 | Morooka | 73/299 |

OTHER PUBLICATIONS

Manual on Installation of Refinery Instruments and Control Systems, API RP 550, Second Edition, Mar. 1965, American Petroleum Institute, Part I, Process Instrumentation and Control.
General Electric Company, Atomic Power Equipment Department, Field Engineering, Process Instrument and Control Training Course, publication by G. P. Stone.
Pressure Vessel Code, Section L, 1983 Edition, General Requirements, PG-60.

*Primary Examiner*—Daniel M. Yasich
*Attorney, Agent, or Firm*—Jack M. Wiseman

[57] ABSTRACT

A differential pressure detector is employed for measuring the liquid level in a pressurized vessel. The differential pressure detector senses the level in a pressurized vessel through a variable head column and a constant head cold reference column. In order for the differential pressure detector to operate accurately, the head of the liquid in the cold reference column is maintained constant. An ambient reference column is in communication with the cold reference column. When the height of the liquid in the cold reference column drops, or the pressure of the pressurized vessel drops, liquid in the ambient reference column will flow into the cold reference column to maintain the head of the liquid in the cold reference column. When the height of the liquid level in the cold reference column is elevated, the excess liquid in the cold reference column overflows into the pressurized vessel. The pressurized vessel is disposed within a containment, while the ambient reference column and the differential pressure detector are located outside of the containment. The variable head column and the constant head column are subject to environmental changes within the containment.

19 Claims, 2 Drawing Figures

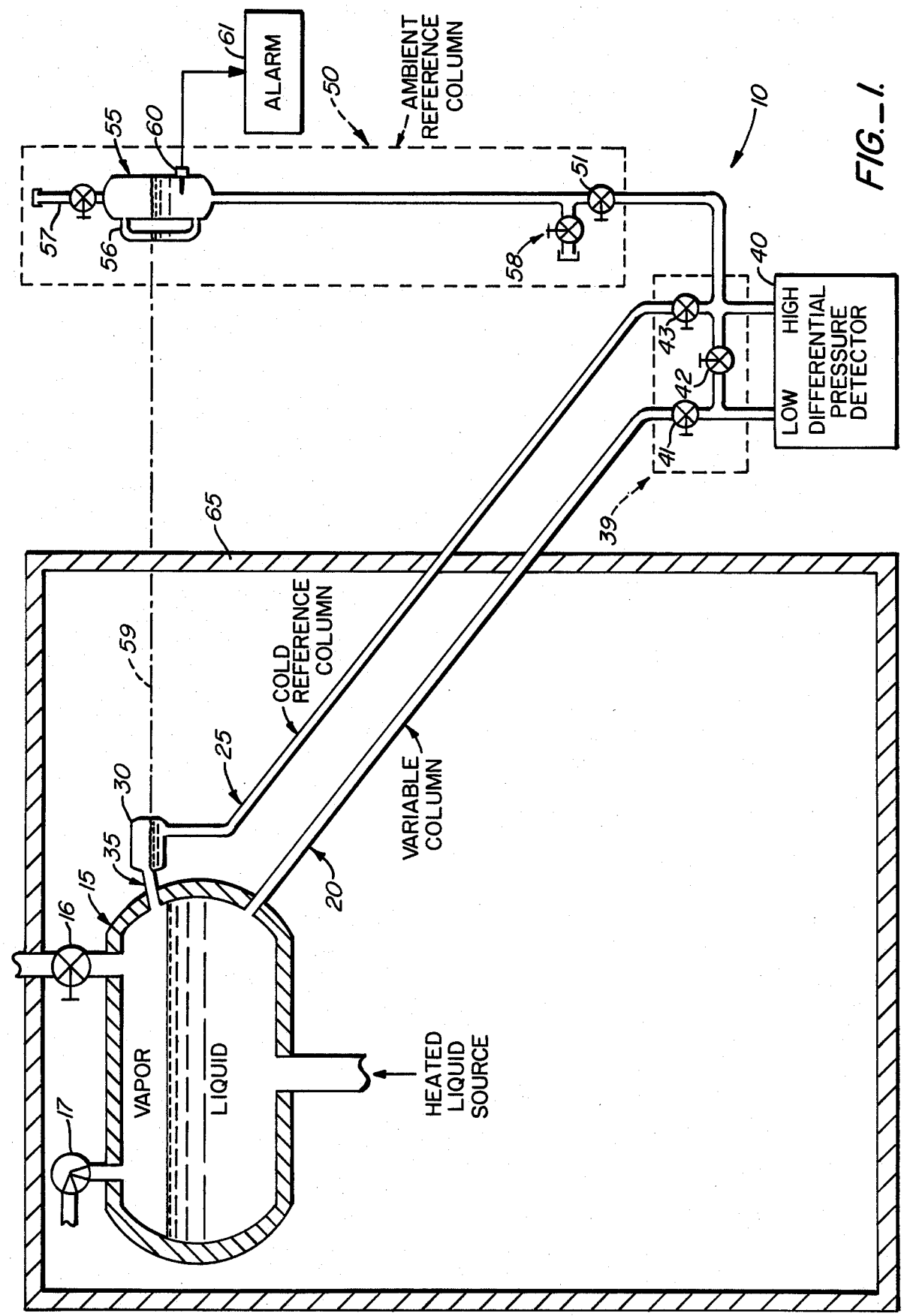
FIG._1.

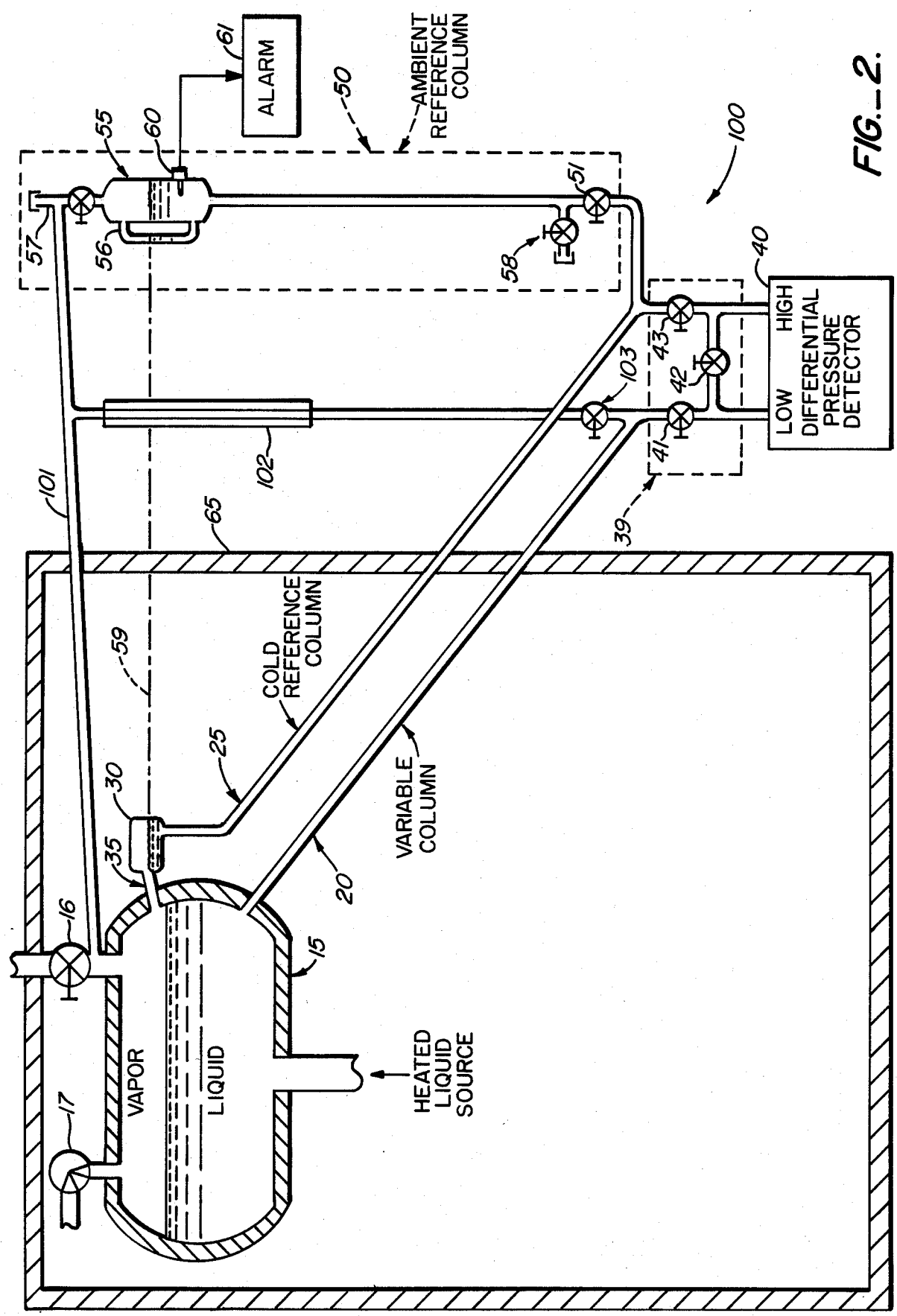
FIG._2.

SYSTEM FOR MEASURING LIQUID LEVEL IN A PRESSURIZED VESSEL

BACKGROUND OF THE INVENTION

The present invention relates in general to a system for measuring the liquid level in a pressurized vessel, and more particularly a system for measuring the liquid level in a pressurized vessel that employs a differential pressure detector for sensing the head of a variable head column and a constant head column.

Liquid level detection and measurement systems perform more accurately during steady-state operating conditions. Steady-state errors result from density differences of liquids between calculated conditions and operating conditions of the variable column and the reference column. During variations in the steady-state operation, transient conditions are generated, which cause liquid level detection and measurement systems to provide inaccurate and misleading results. The transient conditions become of interest when a large pressurized vessel, such as a steam drum in fossil power plants or a steam boiler used in nuclear power plants, is employed for boiling a liquid. The pressurized vessel has the capability of rapid pressure increases and rapid pressure decreases while the liquid level in the pressurized vessel is measured.

Heated reference columns have been employed heretofore to compensate for the density changes in the pressurized vessel. the heated reference column maintained the temperature of the liquid in the reference column close to the temperature of the pressurized vessel to reduce density changes. Heated reference columns, however, are suject to flashing and boiling. Correcting for the density variations by heated reference columns increased the probability of flashing during variations in the steady-state conditions.

In the patent to Morooka, U.S. Pat. No. 4,389,888, issued on June 28, 1983, for Level Meter, there is disclosed a level meter for measuring the liquid level in a pressurized vessel. The liquid level employs a reference column having a condensing chamber, an active column and a differential pressure detector for indicating liquid level. Insulation has been added to the active column and the reference column, excepting the condensing chamber, to retard heating of the columns from an elevated ambient temperature in a drywell. A cooling water jacket is added to the uninsulated portion of the reference column below the condensing chamber to reduce flashing or rapid depressurization and to provide cooling for elevated drywell temperatures.

The patent to Kinderman, U.S. Pat. No. 3,132,516, issued on May 12, 1964, for Liquid Level Indicator, discloses a constant head chamber. A pressurized vessel communicates with the constant head chamber. The constant head chamber is provided with a variable head column and a heated reference column. A pressure differential indicator is connected to the variable head column and the heated reference column. Disposed above the liquid level of the constant head column is an auxiliary head chamber. The auxiliary head chamber communicates with the constant head chamber. In the even of a rapid pressure drop in the pressurized boiler, which causes flashing in the constant head chamber, water from the auxiliary head chamber flows into the constant head chamber to maintain a constant head during fluctuation. As water from the auxiliary head chamber flows into the constant head chamber, steam takes the place of water in the auxiliary head chamber.

The patent to Kinderman, U.S. Pat. No. 3,232,111, issued on Feb. 1, 1966, for Liquid Level Indicator, discloses a heated reference column which includes a constant head chamber. The liquid level indicator measures liquid level in a pressurized vessel with direct or indirect compensation for density changes of the liquid/vapor within the pressurized vessel. The constant head chamber is disposed below the lowest level of any indication to be measured on the gauge.

A variable column, a cold reference column including a condensing chamber, an instrument manifold, and a differential pressure detector are well-known in the remote measurement of liquid level in a pressurized vessel as disclosed in ASME Boiler and Pressure Vessel Code, Section L, paragraph PG-60 and in American Petroleum Institute Standard RP 550.

SUMMARY OF THE INVENTION

In the measuring of the liquid level in a pressurized vessel, a differential detector senses the differential head between the liquid in a variable head column, which indicates the head of the liquid level in the pressurized vessel, and the constant head of the liquid in a cold reference column. In order for the differential pressure detector to operate accurately, the head of the liquid in the cold reference column is maintained constant. An ambient reference column communicates with the cold reference column to maintain a constant head for the liquid in the cold reference column. The pressurized vessel is disposed within a containment, while the ambient reference column and the differential pressure detector are disposed outside of the containment.

When the height or density of the liquid in the cold reference column drops due to a pressure decrease of the pressurized vessel, liquid from the ambient reference column will flow into the cold reference column to maintain the head of the liquid in the cold reference column constant. When the height or the density of the liquid in the cold reference column is elevated, the excess liquid in the cold reference column overflows into the pressurized vessel.

An object of the present invention is to provide a differential pressure liquid level detection and measurement system that maintains a constant head for the liquid in a reference column, and, yet, reduces the possibility of flashing in the reference column.

A feature of the present invention is the employment of a cold reference column to reduce the possibility of flashing in the reference column, while maintaining a constant head for the reference column.

Another feature of the presnt invention is the separation of the ambient reference column from the cold reference column through a containment. The cold reference column is disposed in close proximity to the pressurized vessel for enabling the condensing liquid in the pressurized vessel to fill the cold reference column with liquid. The containment surrounds the pressurized vessel. The differential pressure detector is located outside of the containment. The cold reference column is subject to the environment changes within the containment, while the ambient reference column is not subject to the environmental changes within the containment.

The temperature of the overflow liquid at the overflow discharge port of the cold reference column proximates the temperature of the liquid in the pressurized vessel. Hence, no thermal shock is present at the nozzle of the cold reference column. The temperature of the liquid in the cold reference column approaches containment temperature, except at the discharge port or nozzle of the cold reference column. Thus, the need for a thermal sleeve at the discharge port or nozzle of the cold reference column has been obviated, if the flow of the liquid through the discharge port or nozzle has not be significantly sub-cooled relative to the temperature of the liquid in the pressurized vessel.

DESCRIPTION OF THE DRAWINGS

FIG. 1 is a diagrammatic illustration of the system embodying the present invention for the measuring of the liquid level in a pressurized vessel.

FIG. 2 is a diagrammatic illustration of system for the measuring of the liquid level in a pressurized vessel, which is a modification of the system shown in FIG. 1.

DESCRIPTION OF THE PREFERRED EMBODIMENT

Illustrated in FIG. 1 is a system 10 for measuring the liquid level in a pressurized vessel 15. The pressurized vessel 15 is a well-known steam drum, steam generator or a nuclear boiler. Contained within the pressurized vessel 15 is a liquid, such as a water, and a vapor, such as steam. The liquid is heated in a well-known manner and a vapor is generated from the heated liquid. When a steam valve 16 is closed, a relief valve 17 will cycle between 110% and 90% of operating pressure. For variable pressure boilers with a 10-1 turn down ratio, pressure variations are inherent. The operating pressure within the pressurized vessel 15 is in the range from 1000 psig to 3000 psig. The temperature of the liquid in the pressurized vessel is in the range from 550° F. to 700° F.

A variable column 20 communicates with the pressurized vessel 15 to indicate the pressure head of the liquid in the pressurized vessel 15. A cold reference column 25 contains a column of liquid, such as water. The height of the liquid in the cold reference column 25 is maintained constant to provide a constant head. The cold reference column 25 comprises a chamber 30 in which liquid, such as water, is stored. The chamber 30 communicates with the pressurized vessel 15 through a nozzle 35. The nozzle 35 is connected to the pressurized vessel 15 above the liquid in the pressurized tank 15. The liquid stored in the cold reference column 25, as well as in the chamber 30, is at containment ambient temperature. The temperature of liquid in the cold reference column 25 will be in the range of 135° F. to 330° F. The pressure of the gas in the cold reference column 25 during operation will be from 1000 psig to 3000 psig.

For measuring the liquid level in the pressurized vessel 15, a suitable differential pressure detector 40 is employed. The differential pressure detector 40, in the preferred embodiment, is of the type manufactured by ITT, Barton Instruments and Controls, of Monterey Park, Calif., Model No. 227. The differential pressure detector 40 senses the head of the liquid in the pressurized vessel via the variable column 20 and senses the head of the liquid in the cold reference column 25.

The variable head column 20 is connected to normally opened valve 41 of the instrument manifold 39. The instrument manifold 39 also comprises a normally opeed high pressure connection shutoff valve 43 and a cross-over valve 42. The cross-over valve 42 is normally closed and is used to adjust the differential pressure detector 40 to a zero meter reading. The valve 43 is connected to the cold reference column 25.

Connected to the cold reference column 25 via the valve 51 is an ambient reference column 50. A suitable liquid at ambient temperature, such as water, is contained in the ambient reference column 50. The ambient temperature for the liquid in the ambient reference column 50 is the ambient temperature outside of a containment 65, such as a reactor building. Included in the ambient reference column 50 is a suitable reservoir 55 in which is stored liquid, such as water, at ambient temperature. The level of the liquid in the reservoir 55, in the preferred embodiment, is at the same height as the level of the liquid in the chamber 30. The pressure of the gas in the ambient reference column 50 during operation will be the same as the pressure of the pressurized vessel 15. The temperature of the liquid in the ambient reference column 50 will be in the range of 50° F. to 100° F.

A suitable glass gauge 56 is mounted on the reservoir 55 to give a visible reading of the level of the liquid in the reservoir 55 of the ambient reference column 50. At the top of the reservoir 55 is a vent and inlet conduit 57 for venting air in the reservoir 55 to atmosphere and for charging the supply of gas in the reservoir 55. The lower end of the ambient reference column 50 is connected at the instrument manifold 39 to the cold reference column 25. At a preselected height along the reservoir 55 is a suitable sensing device 60. When the liquid level in the reservoir 55 drops below a critical height to impair the accuracy of the differential pressure detector 40, the level sensing device 60 is activated to initiate an alarm 61 to indicate the need for compensating for the drop in the reference head. The sensing device 60, in the preferred embodiment, is manufactured and sold by Fluid Components, Inc. of Canoga Park, Calif. as Model 8-66.

The conventional containment or drywell 65 surrounds the pressurized vessel 15. The variable column 20 and the cold reference column 25 are subject to the environmental changes of the containment 65. The differential pressure detector 40, the instrument manifold 39 and ambient reference column 50 are disposed outside of the containment or drywell 65, and within a suitable area, such as a reactor building.

It is to be observed that the ambient reference column 50 is separated from the cold reference column 25 through the drywell 65. The condensing chamber 30 is in close proximity to the pressurized vessel 15 for condensing liquid in the pressurized vessel 15 to maintain the liquid level of the cold reference column 25. The containment or drywell 65 is placed around the pressurized vessel 15 to limit the environmental effects outside the containment or drywell 65. The cold reference column 25 is subject to environmental changes inside the containment or drywell 65, while the ambient reference column 50 is not subject to the environmental changes within the containment or drywell 65.

Access to the area within the containment or drywell 65 is limited to shutdown conditions. During transient conditions, which can cause the contained environment within the containment or drywell 65 to reach elevated temperatures, elevated pressures and high concentration of gases, the ambient reference column 50 is outside of the containment or drywell 65 and is accessible. The gauge 56 can be monitored, the vent/fill conduit 57 can be used and the density of the liquid within the ambient reference column 50 will remain at ambient temperature.

When the liquid in the cold reference column 25 is subject to a temperature above containment ambient temperature and the pressure of the pressurized vessel 15 is decreased, the liquid vaporizes. Vaporization of the liquid in the cold reference column 25 causes density variations in the liquid and height variations of the level of the liquid in the cold reference column 25. Height variations of the level of the liquid in the cold reference column 25 will change the static reference head. A constant static reference head of the liquid in the cold reference column 25 is required in order to operate accurately the differential pressure detector 40.

When the liquid in the cold reference column 25 and the liquid in the ambient temperature column 50 are at the same temperature, the liquid in the cold reference column 25 is at the same level as the liquid in the ambient reference column 50.

Prior to operation of the pressurized vessel 15 and while at atmospheric pressure, the ambient reference column 50 is filled to the reference level via liquid charging conduit 58. By opening the valve 51, the cold reference column 25 including condensing chamber 30 can also be filled to a reference level 59. The ambient reference column 50 is charged for pressurized operation by closing the valve 51 and introducing a source of pressurized gas, such as nitrogen, through the fill and vent conduit 57. The ambient reference column 50 thereby be charged to operating pressure. When the pressurized vessel 15 is heated to operating temperature, the valve 51 is opened to allow the ambient reference column 50 is communicate directly with the cold reference column 25. The reservoir 55 contains a pressurized source of liquid to replace liquid in the cold reference column 25 including the liquid in the condensing chamber 30. The liquid in the condensing chamber 30 is subject to vaporization through the elevated temperature in the containment or drywell 65 and the reduced pressure of the pressurized vessel 15. As a consequence thereof, the temperature of the liquid in the cold reference column 25 is above saturation temperature at the reduced pressure of the pressurized vessel 15. The volume of the reservoir 55 is such that it contains the number of cubic inches of gas at operating pressure to displace the required number of cubic inches of liquid to replace or purge liquid which vaporized in the cold reference column 25 including liquid purged in the condensing chamber 30 as a result of decreased pressure in the pressurized vessel 15 and elevated temperature in the containment or drywell 65. The volume and shape of reservoir 55 is designed to supply the required amount of liquid to replace the liquid lost from the cold reference column 25 including liquid lost from the condensing chamber 30 when the pressurized vessel 15 is depressurized.

As the liquid in the cold reference column 25 reaches the vaporization temperature for the pressure in the pressurized vessel 15, which is the same pressure for the chamber 30, there will be a loss of liquid in the chamber 30 resulting from the vaporization due to depressurization. As a consequence thereof, the height of the liquid in the cold reference column 25 is reduced. The liquid in the ambient reference column 50 will thereupon flow into the cold reference column 25 via the valve 51 to maintain the head of the liquid in the cold reference column 25 constant.

As the density of the liquid in the cold reference column 25 decreases to reduce the head of the liquid in the cold reference column 25 to a magnitude which may impair the accuracy of the operation of the differential pressure detector 40, the level of the liquid in the ambient reference column 50 will likewise be lowered. If the lowering of the liquid in the ambient reference column 50 reaches a critical level, the level sensing device 60 is activated for operating the alarm 61 to indicate the need to compensate for the variations in the reference head.

If there is a decrease in the pressure of the pressurized vessel 15, liquid will flow from the chamber 30 into the pressurized vessel 15 through the nozzle 35. The temperature of the liquid in the chamber 30 will be at containment ambient temperature, except for the temperature of the liquid overflowing through the overflow discharge port or the overflow outlet connection of the nozzle 35. The temperature of the liquid overflowing at the discharge port or the outlet of the nozzle 35 proximates the temperature of the liquid in the pressurized vessel 15. Hence, a thermal sleeve is not required at the discharge port or outlet connection of the nozzle 35, unless the liquid flowing through the discharge port or outlet connection is significantly sub-cooled relative to the liquid in the pressurized vessel 15.

Should the level of the liquid chamber 30 be elevated above the height of the nozzle 35, the excess liquid will overflow through the nozzle 35 into the pressurized vessel 15.

Illustrated in FIG. 2 is system 100 for measuring the liquid level in the pressurized vessel 15. In the system 100, a conduit 101 provides a steam lead connection between the vapor area of the pressurized vesel 15 and the conduit 57 of the ambient reference column 50. The connection between the conduit 101 and the pressurized vessel 15 is above the connection between the condensing chamber 30 and the pressurized vessel 15. A source of vapor pressure from the pressurized vessel 15 is supplied to the reservoir 55 in lieu of the captive volume of gas present prior to the operation of the system 100 by charging the reservoir 55 to the operating pressure.

The system 100 is applied if the pressurized vessel 15 can be repressurized after the first depressurization or can be operated for extended periods of time in a depressurized state while the containment or drywell 65 is held at an elevated temperature. The operation of the system 100 is similar to the operation of the system 10, except the gas volume of the reservoir 55 will be at the pressure of the pressurized vesesl 15. The ambient reference column 50 will not require charging to the operating pressure of the pressurized vessel 15 prior to operation. The liquid stored in the reservoir 55 will act as a U-tube to replenish liquid lost in the cold reference column 25, including the liquid chamber 30, regardless of the pressure of the pressurized vessel 15.

A source of liquid is provided which is not pressure senstivie, but is sensitive to the relative head of liquid between the cold reference column 25, including the liquid chamber 30, and the head of the liquid in the ambient reference column 50.

A level glass gauge 102 is connected to the conduit 101 and the variable column 20 via a valve 103. The gauge 102 provides a visual indication not corrected for density of the level of liquid in the pressurized vessel 15 outside of the containment or drywell 65. The gauge 102 is accessible during normal operation or under accident conditions.

I claim:
1. A system for measuring liquid level in a pressurized vessel containing a liquid, said pressurized vessel being disposed within a containment vessel, said system comprising:
  (a) a variable column communicating with said pressurized vessel for indicating the head of the liquid contained in said pressurized vessel;
  (b) a cold reference column for providing a constant reference head and subject to the environmental changes within said containment vessel, said cold reference column containing a column of liquid, said cold reference column communicating with said pressurized vessel through a wall of said containment vessel;
  (c) an ambient reference column containing a column of liquid at ambient temperature, said ambient reference column being disposed outside of said containment vessel, said ambient reference column being in communication with said cold reference column for liquid in said ambient reference column to flow into said cold reference column to replace the head of the liquid in said cold reference column when the pressure in said pressurized vessel drops for maintaining a constant head in said cold reference column; and
  (d) a differential pressure detector intermediate one end of both said variable column and said cold reference column and one end of said ambient reference column sensing the head of said variable reference column and said cold reference column for the measuring of the liquid level in said pressurized vessel, said differential pressure detector being disposed outside of said containment vessel.

2. A system as claimed in claim 1 wherein said cold reference column at the upper end thereof comprises a chamber in which liquid is stored and wherein said ambient reference column at the upper end thereof comprises a reservoir in which liquid is stored, the liquid level of said reservoir being at even height with the liquid level in said chamber during steady state conditions.

3. A system as claimed in claim 2 wherein said ambient reference column is a source of liquid for replacing vaporized liquid in said cold reference column by discharging liquid into said cold reference column when the height of the liquid in said cold reference column decreases due to vaporization.

4. A system as claimed in claim 2 and comprising a gauge mounted on said reservoir for indicating visually the liquid level of said cold reference column.

5. A system as claimed in claim 2 and comprising a gauge mounted on said reservoir for indicating visually outside said containment vessel the liquid level of said cold reference column.

6. A system as claimed in claim 2 and comprising means including an alarm responsive to the liquid level in said reservoir when the liquid level of said reservoir is below a predetermined height.

7. A system as claimed in claim 1 wherein said ambient reference column comprises a reservoir, said system comprising a conduit between said pressurized vessel and said reservoir for the flow of vapor under pressure.

8. A system as claimed in claim 7 and comprising a liquid level gauge connected between said conduit and said variable column for indicating the level of liquid in said pressurized vessel, said gauge being disposed outside of said containment vessel.

9. A system as claimed in claim 7 wherein said ambient reference column is a source of liquid for replacing vaporized liquid in said cold reference column by discharging liquid into said cold reference column when the height of the liquid in said cold reference column decreases due to vaporization.

10. A system as claimed in claim 7 and comprising means including an alarm responsive to the liquid level in said reservoir when the liquid level of said reservoir is below a predetermined height.

11. A system as claimed in claim 1 wherein said ambient reference column is a source of liquid for replacing vaporized liquid in said cold reference column by discharging liquid into said reference column when the pressure of said vessel is reduced, thereby maintaining a constant head in said cold reference column.

12. Apparatus for measuring the liquid level of a pressurized vessel in a containment vessel wherein the head of the liquid contained in the pressurized vessel is sensed and compared with the head of liquid in a cold reference column in said containment vessel, said apparatus comprising an ambient reference column outside of said containment vessel containing a column of liquid at ambient temperature, indicating means to sense the head of liquid in said cold reference column, the head of liquid in said pressurized vessel, and the head of liquid in said ambient reference column for the measuring of liquid in said pressurized vessel, said ambient reference column being in communication with said cold reference column for liquid in said ambient reference column to flow into said cold reference column to restore the head of the liquid in said cold reference column when the pressure in said pressurized vessel drops for maintaining a constant head in said cold reference column.

13. Apparatus as claimed in claim 12 wherein said ambient reference column includes a reservoir for containing liquid.

14. Apparatus as claimed in claim 13 and comprising a level gauge disposed outside said containment vessel communicates with said reservoir to give a visual indication of the level of liquid in said cold reference column.

15. Apparatus as claimed in claim 13 and comprising means including an alarm responsive to the height of the liquid in said reservoir when the liquid in said reservoir falls below a predetermined height.

16. Apparatus as claimed in claim 13 wherein said ambient reference column is a source of liquid for replacing vaporized liquid in said cold reference column by discharging liquid into said cold reference column when the pressure of said pressurized vessel is reduced, thereby maintaining a constant head in said cold reference column.

17. Apparatus as claimed in claim 13 wherein said ambient reference column is a source of liquid for replacing vaporized liquid in said cold reference column by discharging liquid in to said cold reference column when the height of the liquid in said cold reference column decreases due to vaporization.

18. Apparatus as claimed in claim 13 and comprising a level gauge disposed outside said containment vessel and communicating with said pressurized vessel to give a visual indication of the level of liquid in said pressurized vessel.

19. Apparatus as claimed in claim 12 wherein said cold reference column is subject to environmental changes within said containment vessel.

* * * * *